US00RE35335E

United States Patent [19]

Calfee

[11] E Patent Number: Re. 35,335

[45] Reissued Date of Patent: Sep. 24, 1996

[54] COMPOSITE BICYCLE FRAME

[76] Inventor: Craig D. Calfee, 115 Post St., Santa Cruz, Calif. 95060

[21] Appl. No.: 143,284

[22] Filed: Oct. 25, 1993

Related U.S. Patent Documents

Reissue of:

[64] Patent No.: 5,116,071
Issued: May 26, 1992
Appl. No.: 321,510
Filed: Mar. 9, 1989

[51] Int. Cl.[6] ..... B62K 3/02; B62K 19/02

[52] U.S. Cl. ..... 280/281.1; 264/258

[58] Field of Search ..... 280/281.1; 264/258

[56] References Cited

U.S. PATENT DOCUMENTS

| | | | |
|---|---|---|---|
| 2,370,726 | 3/1945 | Hess et al. | 280/281.1 |
| 3,833,242 | 9/1974 | Thompson, Jr. | 280/281.1 |
| 3,966,230 | 6/1976 | Nicol | 280/281.1 |
| 4,230,332 | 10/1980 | Porsche | 280/281.3 |
| 4,493,749 | 1/1985 | Brezina | 280/281.1 |
| 4,500,103 | 2/1985 | Klein | 280/281.1 |
| 4,513,985 | 4/1985 | Graham | 280/281.1 |
| 4,513,986 | 4/1985 | Trimble | 280/281.1 |
| 4,541,649 | 9/1985 | Grünfeld | 280/281.1 |
| 4,621,827 | 11/1986 | Klein | 280/281.1 |
| 4,657,795 | 4/1987 | Foret | 280/281.1 |
| 4,705,286 | 11/1987 | Lauzier et al. | 280/281.1 |
| 4,828,781 | 5/1989 | Duplessis et al. | 264/257 |
| 4,850,607 | 7/1989 | Trimble | 280/281.1 |
| 4,856,800 | 8/1989 | Hashimoto et al. | 280/281.1 |
| 4,900,048 | 2/1990 | Derujinsky | 280/281.1 |
| 4,900,050 | 2/1990 | Bishop et al. | 280/281.1 |
| 4,941,674 | 7/1990 | Trimble | 280/281.1 |

OTHER PUBLICATIONS

Barnett, "Bicycling with Advanced Composites", Advanced Composites Magazine, Jan.–Feb., 1987, pp. 40–46.

"New Products", Bicycling Magazine, Mar. 1989, pp. 46 and 50.

"Bike Tech", Bicycling Magazine, Mar. 1989, pp. 204 and 206.

*Primary Examiner*—Mitchell J. Hill
*Attorney, Agent, or Firm*—Jonathan A. Small

[57] ABSTRACT

A bicycle frame manufactured of one or more continuous fiber composite tubes, wherein the tubes are joined to one another without lugs by overlaying the joints with resin impregnated continuous fiber composite material and clamping the joints in static pressure molds. Gussets are integrally formed as part of the joints. One or more of the tubes may be metal, preferably titanium. The bicycle frame is provided with metal drop outs which are also preferably titanium.

14 Claims, 7 Drawing Sheets

COMPOSITE BICYCLE FRAME

Matter enclosed in heavy brackets [ ] appears in the original patent but forms no part of this reissue specification; matter printed in italics indicates the additions made by reissue.

BACKGROUND

1. Field of the Invention

The present invention relates generally to bicycle frames, and more particularly to bicycle frames of composite materials formed without lugs.

2. Description of the Prior Art

Traditionally, bicycle frames have been composed of metal tubes, such as steel, welded into lugs at the tube joints. Non-metal materials for construction of various portions of bicycle frames have also been utilized. A number of manufacturers offer bicycle frames whose tubes are made of woven carbon fiber for example. The benefits of using such a material in place of steel is its greater strength-to-weight ratio than steel. The difficulty arises, however, with the bonding of one tube of such material to another.

Most manufacturers have bonded carbon fiber tubing to cast and machined aluminum alloy connections to form tube joints. The problems associated with bonding carbon fiber to aluminum stem from the fact that the two different materials have extremely different structural properties. The drawbacks of bonding two dissimilar materials such as carbon fiber and aluminum for structural applications include:

1) The coefficients of thermal expansion of the two materials are substantially different. This can result in stress and/or strain being applied at the bonding surfaces which can weaken the bond and lead to joint failure.

2) The modulus of elasticity of aluminum is substantially lower than that of most composite materials, including commonly used carbon fiber materials. This, means that relatively large, bulky connectors, or lugs, are required to provide the needed strength—at the cost of adding weight to the frame. This also means that the stiffness of the frame is discontinuous at the connections.

3) Aluminum readily corrodes when joined with carbon fiber due to the substantial difference in the galvanic corrosion potentials of the two materials.

4) Finally, the different fatigue characteristics of the two materials increases the potential for failure to occur at the connections.

Simply stated, these bonded frames have failed to optimize the structural benefits of the composite materials.

Attempts have been made to create bicycle frames with plastic tubes and injection molded connections. These connections are not suitable for a lightweight racing bicycle frame because there is no injection molded material which matches the stiffness and strength of steel or composite tubes required to withstand the rigorous abuse of racing conditions.

Monoloque frames exist which approach the optimal design for a composite bicycle frame. These frames are essentially one-piece molded structures. By "one-piece" it is meant that the frame is molded as a single complete unit. The primary drawbacks of this type of frame is the expense and complexity of tooling (including making the molds and related equipment, etc.), and the relative labor intensiveness of manufacture. A different mold is required for each size of frame. Pressure is required inside the tubes to expand the tubes such that they compress against the mold cavities. This pressure is usually applied by way of expandable rubber mandrels or bladders which involve additional expense and complexity. Pressure can also be applied by co-curing the composite with an internal foam core. The cure must be performed at elevated temperatures which cause the foam to expand and compress the composite material. The foam remains inside the tube as a permanent part of the structure. It is difficult, however, for the foam to apply sufficient pressure, with the result that the cured composite tube may contain voids (air pockets) which could result in premature delamination (separation) of the plies of composite material. For these reasons, bicycle frames manufactured by this process are generally more expensive and harder to produce in varied sizes and geometries than traditionally manufactured frames.

Finally, a steel frames have been manufactured in "lugless" design, also referred to as fillet-brazed frames, for some time. As well, gussets have been incorporated into bicycle frame design in the past. However, in each case, welding or soldering is the exclusive method used for joining tubes or gussets, and that method is clearly not employable when composite tubes are used.

SUMMARY OF THE INVENTION

The present invention provides a bicycle frame and method of manufacturing the same which overcomes the drawbacks enumerated above, as well as others, found in the prior art. This is accomplished by providing a lugless frame construction wherein individual frame tubes are joined together by epoxy-impregnated carbon fiber fabric. Gussets are integrally and simultaneously formed with the joining of the tubes. In this way a strong, lightweight joint is provided without the disadvantages associated with bonding carbon fiber tubes to aluminum connections.

In the method of the present invention, the structural members forming the frame are carbon fiber tubes having their fibers oriented in the appropriate direction for each frame tube. The tubes are cut to the appropriate lengths, and mitered to form proper mating between them. Static pressure molds are then positioned for the selected size and geometry of the frame. Epoxy impregnated continuous carbon fiber fabric is than laid into the molds, and the frame tubes laid above the fabric. Additional fabric is than laid above the frame tubes. Preferably this fabric is continuous with the fabric laid below the tubes. The fabric and tube "sandwich" is then compressed in the static pressure molds, at the joints, to form hardened all-carbon fiber joints.

Gaps are provided between the mold sections to allow carbon fiber fabric to extend out from the joint during formation. This is generally referred to as "flash" and is trimmed off in most applications. However, the flash formed in the method of the present invention is trimmed appropriately to form gussets. These gussets are, therefore, integral with the joint, and formed simultaneously therewith. In this way, a lugless joint is formed, having continuous fibers and gussets for strength, and carbon-to-carbon lamination for optimal joint characteristics, which is of minimal weight.

DETAILED DESCRIPTION OF THE PREFERRED EMBODIMENT

Figure 1:
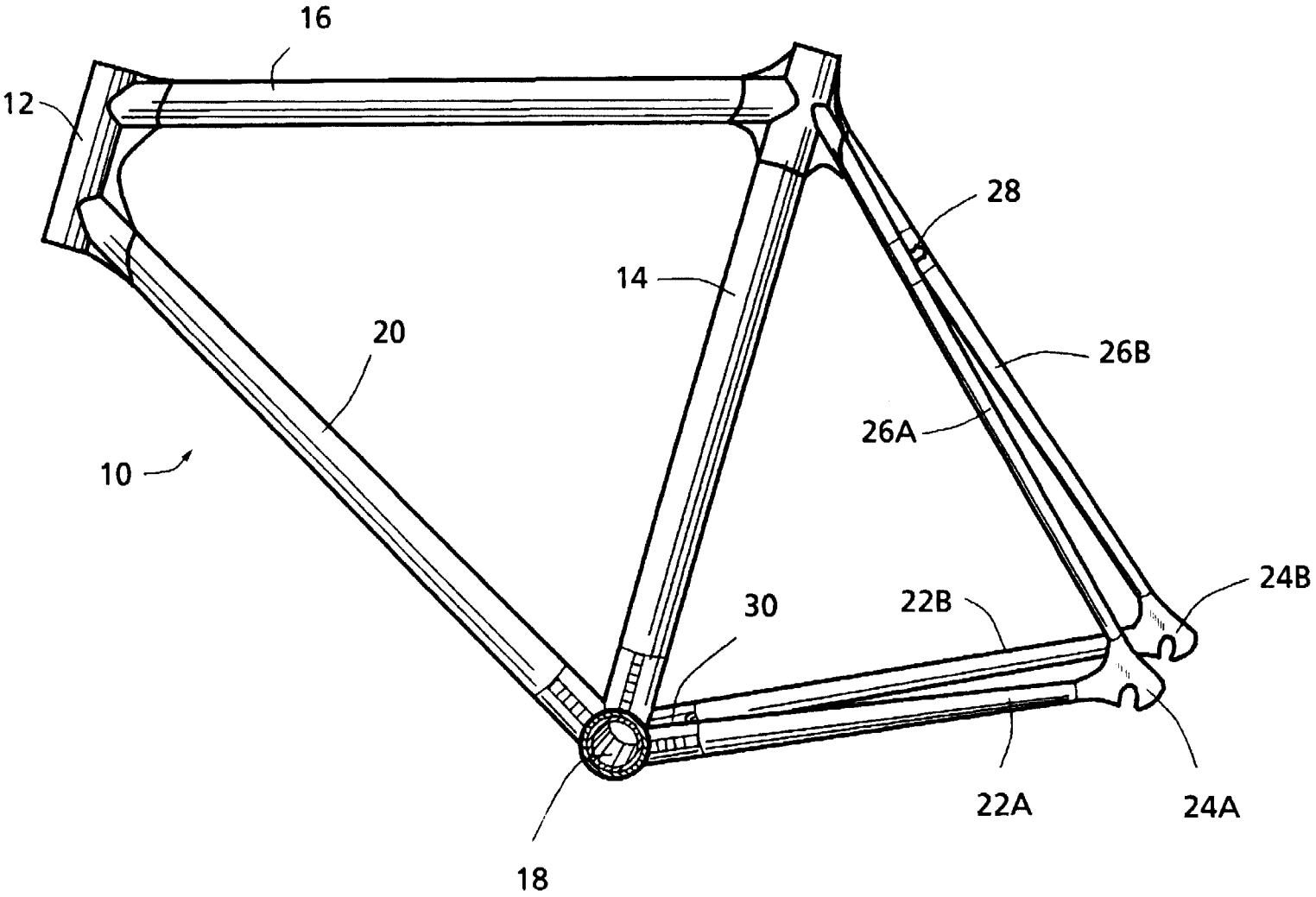
FIG. 1 shows a bicycle frame built according to the present invention.

FIG. 1 shows a bicycle frame 10 built according to the present invention. The frame consists of a head tube 12, a seat tube 14, a top tube 16, a bottom bracket shell 18, down tube 20, two chain stays 22a, 22b, two rear drop-outs 24a, 24b, and two seat stays 26a, 26b. The frame consists further of continuous fiber composite fabric material as discussed further below. Each of the components except the rear drop-outs 24a, 24b will generally be referred to as "tubes" although, as stated below, the components may be of other shapes than tubular.

As shown in FIG. 1, the head tube 12 is connected to the top tube 16 and down tube 20, the seat tube 14 is connected to the top tube 16 and bottom bracket shell 18, the down tube 20 connected also to the bottom bracket shell 18, each of the chain stays 22a, 22b connected to the bottom bracket shell 18 and one of the rear drop-outs 24a, 24b, and each of the seat stays connected to the seat tube 14 and one of the rear drop-outs 24a, 24b. This is essentially the arrangement of a of a traditional bicycle frame. It will be appreciated that fewer or greater numbers of tubes and different tube connections are possible, where appropriate, and such alternate arrangements are not excluded by any aspect of the present invention.

Optionally, a brake bridge 28 may connect the seat stays 28a, 28b between the points where the seat stays 28a, 28b connect to the seat tube 14 and where they connect to the rear drop-outs 24a, 24b. Similarly, an optional chain stay bridge 30 may connect the stays 22a, 22b between the points where the chain stays 22a, 22b connect to the bottom bracket shell 18 and where they connect to the rear drop-outs 24a, 24b.

Generally, each of the tubes of frame 10 will be a longitudinal member having an annular cross-sectional shape. In appropriate circumstances, however, the tubes may be solid and/or of oval tear-drop or other selected cross-sectional shape, with the exception that certain of the components, such as head tube 12 and bottom bracket shell 18, must always have cylindrical void extending their internal length to receive rotating members.

Each of the tubes will generally be manufactured of a carbon-fiber composite material impregnated with a thermosetting epoxy, resin or other hardening agent. Other fiber materials may be used such as fiberglass, Kevlar aramid, boron, or a polyethylene fiber (such as Spectra™) etc. These other fiber materials may also be used in the material used to form the joints. In addition, the various materials may be used in combination with one another. The fibers in the tubes, and the material used to form the joints, may be uni-directional tape, woven fabric, braided, or any other process known in the art to align continuous fibers for structural purposes. Further, non-composite materials such as aluminum alloy, titanium, steel, etc. may be used for any of the tubes. In certain applications, the tubes need not be all of a uniform material-they may be selected according to strength, weight and other considerations, as discussed further below.

Assembly of frame 10 follows the following general steps. The preparation of the tubes begins by cutting them from stock to a length which is slightly longer than their final length. The ends of the tubes are mitered in such a way that the end of one tube is in relatively complete engagement with the outer surface of the tube to which it is to be joined. In addition, the tubes are mitered sufficiently to ensure that each tube is the exact length required. Finally, the ends of the tubes are cleaned and sanded in preparation for joining.

Figure 2:
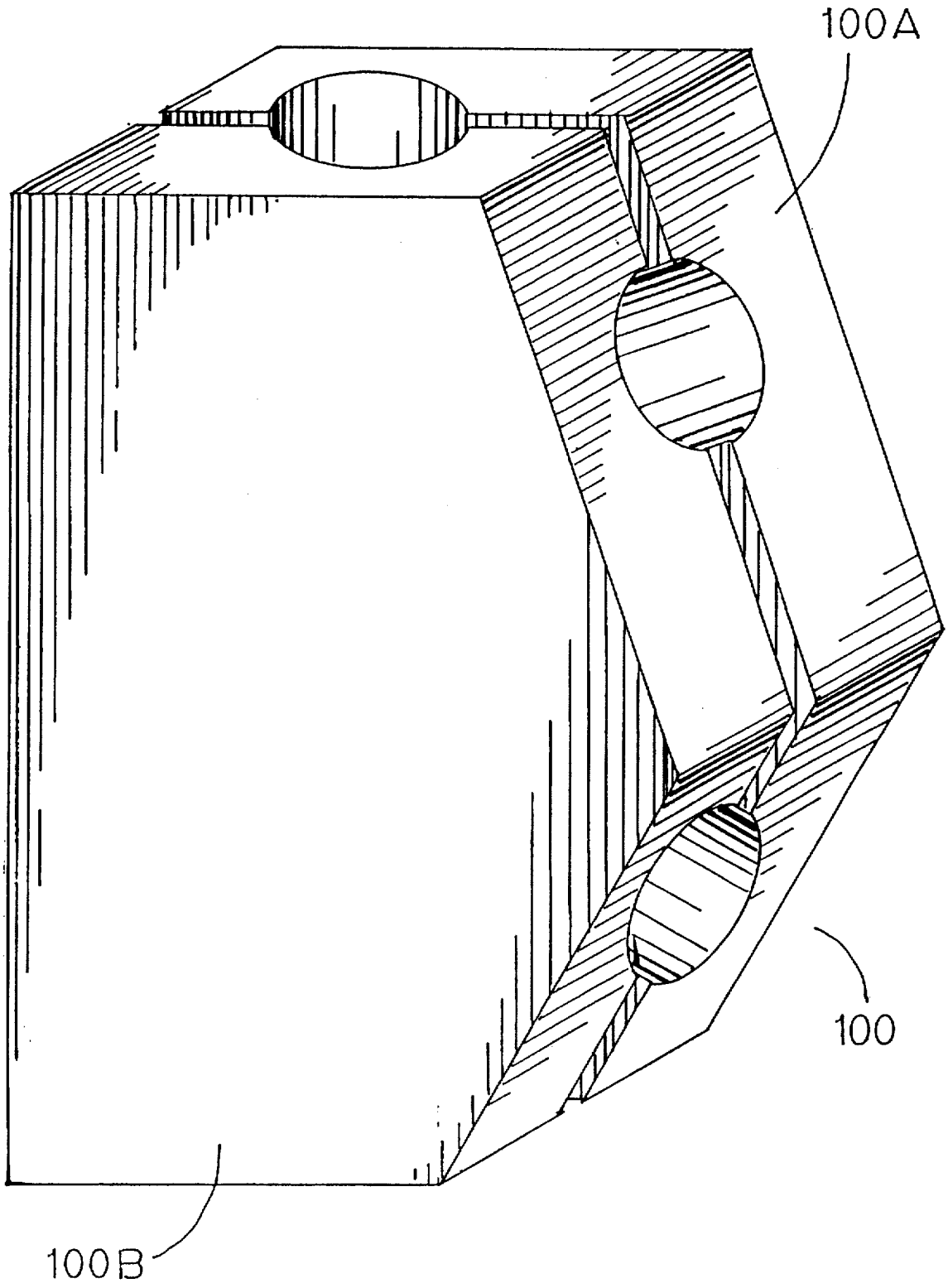
FIG. 2 shows in a perspective view an assembled head tube mold used in the method of the present invention.

The apparatus for forming tube joints of a completed bicycle frame include three sets of static pressure molds. The three molds required are: (1) the head tube mold (for joining the top tube, down tube and head tube); (2) the seat tube mold (for joining the top tube, seat tube and two seat stays); and (3) the bottom bracket mold (for joining the bottom bracket shell, down tube, seat tube and two chain stays). The molds consist of a number of sections. The molds open such that the sections separate to reveal the cavities therein. The sections may be provided with alignment pins to assure proper alignment of the mold sections. The sections may be clamped together, or bolted or otherwise secured together. The top tube mold consists of two such sections, the seat tube mold of three sections, and the bottom bracket mold consists of four sections. FIG. 2 shows an example of an assembled head tube mold 100, in perspective, consisting of a bottom half 100a and a top half 100b.

Also required for formation of a complete frame are a table (not shown) on which the molds are aligned and secured, and a jig (not shown) attach the rear drop-outs to the appropriate tubes. The molds may be of any suitable material, although those made of metal are preferred since only traditional machining techniques such as milling and polishing are required. The molds may be either fixedly or removably secured to the table, although removably secured molds are preferred to allow the table to be used for a variety of frame sizes and geometries.

Figure 3A:
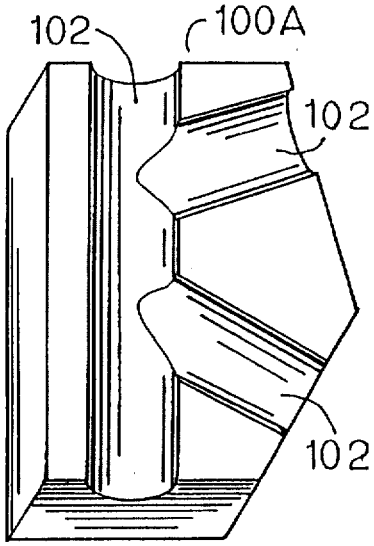
FIGS. 3A, 3B, 3C, and 3D show various steps in the process of forming head tube connections according to the present invention.

FIGS. 3A through 3D show a number of steps in the process of forming a bicycle frame according to the present invention. FIG. 3A shows the bottom half 100a of head tube mold 100. As stated, mold 100 will have a number of cavities 102 and 103 for receiving tube sections. In their simplest form, the mold cavities 102 are conic sections. Mold cavity 103 is a cylinder. The largest diameter of the mold cavities 102 is at the end thereof where one tube joins to another tube.

Figure 3B:
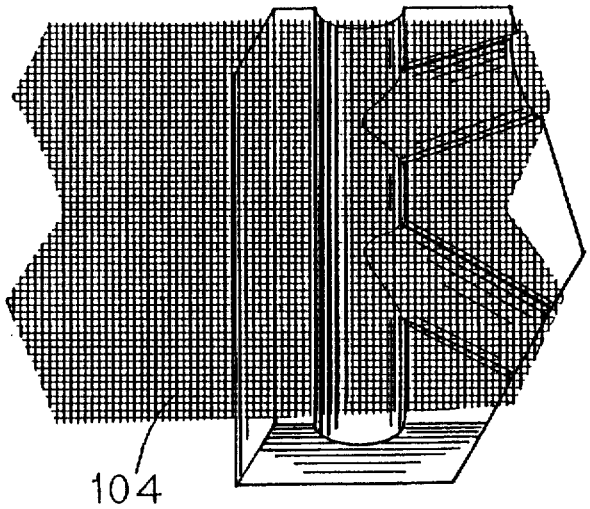

The cavities of the mold 100 may first be treated with a mold release material of appropriate type known in the art. As shown in FIG. 3B, piles of continuous carbon-fiber fabric 104 are cut to shape such that when laid in the mold a predetermined amount of overhang extends beyond the cavities. The plies are laid up to a predetermined thickness over bottom half 100a of mold 100. The orientation of the fibers may be arranged such as to control the characteristics of the resulting joint, as described further below. The plies are impregnated with an uncured ("wet") epoxy, either before or after laying up the material in the mold. Alternatively, "prepreg" (material pre-impregnated with resin) may be used.

Figure 3C:
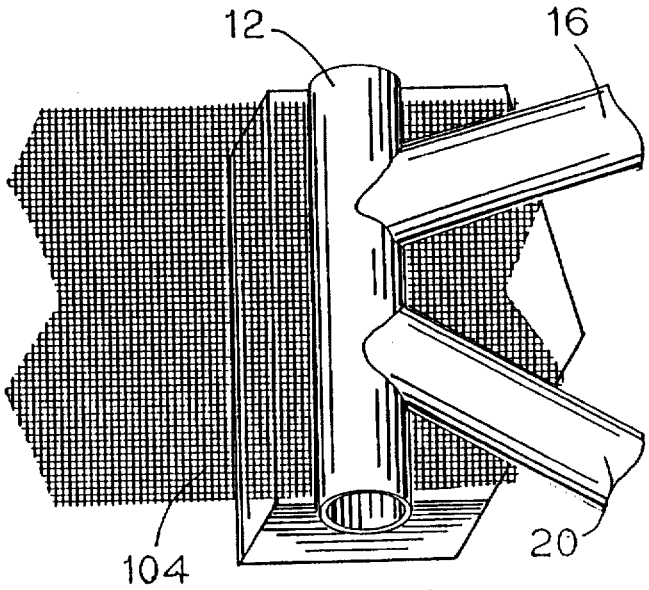
Figure 3D:
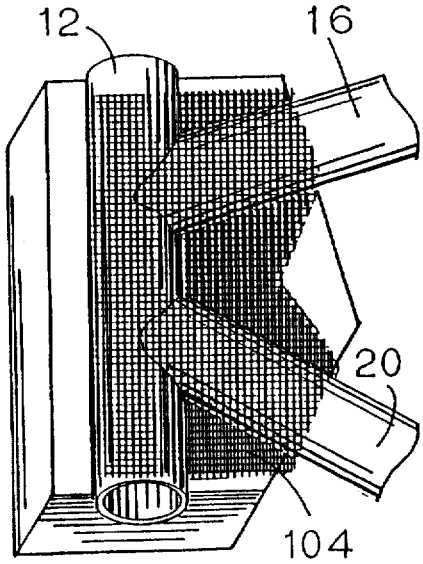

The tubes (such as head tube 12, top tube 16 and down tube 20) are then placed over their appropriate cavities such that the mitered ends and appropriate tube sections are laid upon the fiber fabric 104. This is shown in FIG. 3C. A portion of the uncured fiber fabric 104 is then laid over the tubes such that the tube joints are in essence pinched between the over lapping fiber fabric, thereby establishing laminated contact between the fiber fabric and the tubes. This is shown in FIG. 3D.

Figure 4:
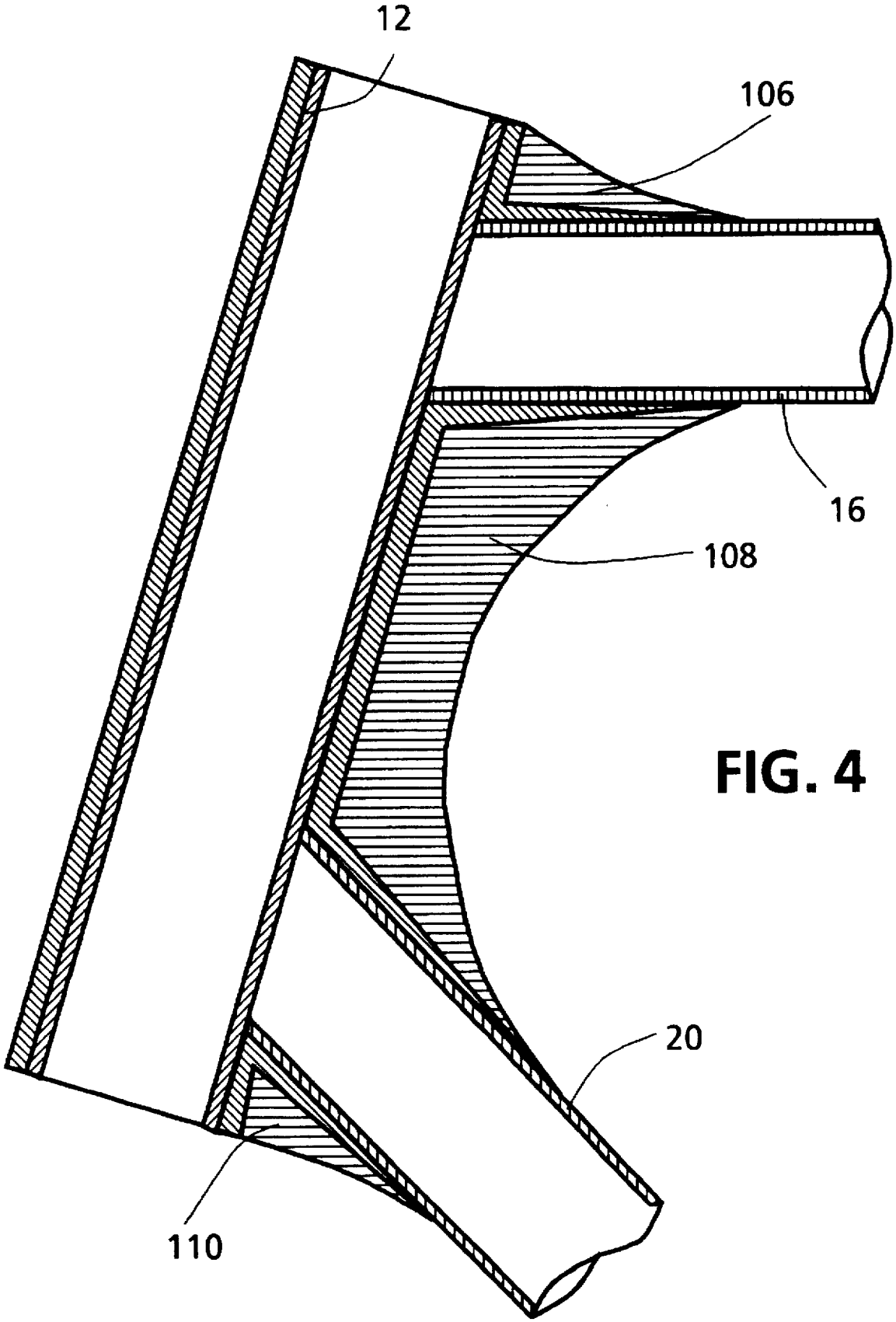
FIG. 4 shows in cross-sectional view a head tube connection according to the present invention.

Finally, the upper half 100b of mold 100 is placed over the tube and fabric sandwich. The mold sections are then clamped together. All pressure is applied through securing of the molds, hence the term "static pressure molds". No other pressure source such as rubber bladder or mandrels are required. Heat can be applied to the molds to help the epoxy cure at a faster rate. The result is fabric material pressure-laminated to the tubes to form a complete and structural integral joint. FIG. 4 shows a cross section of the head tube 12 and its connection to the top tube 16 and the down tube 20.

Figure 5A:
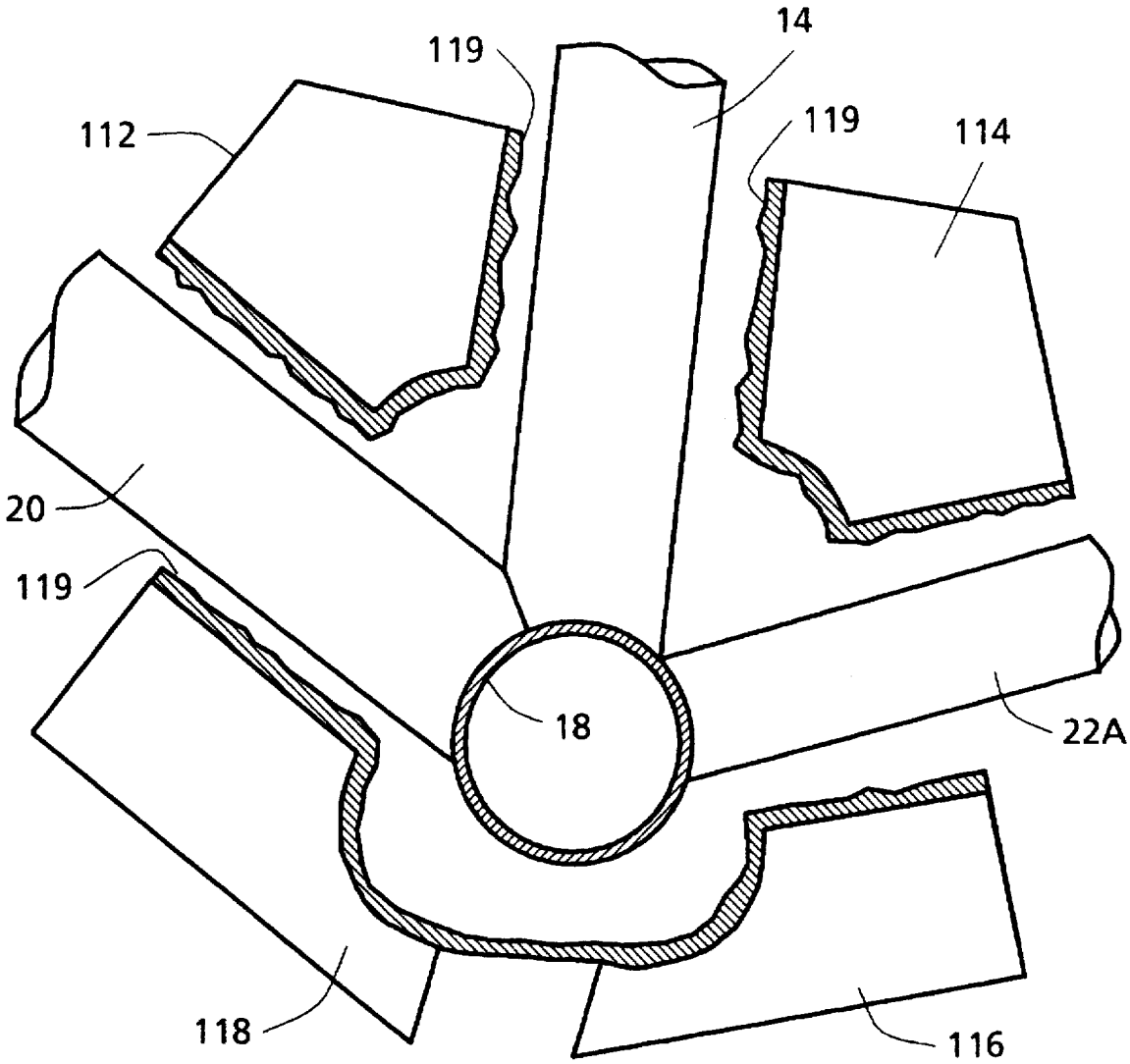
FIGS. 5A, 5B, and 5C show various steps and the result of the process of forming a bottom bracket connection according to the present invention.
Figure 5B:
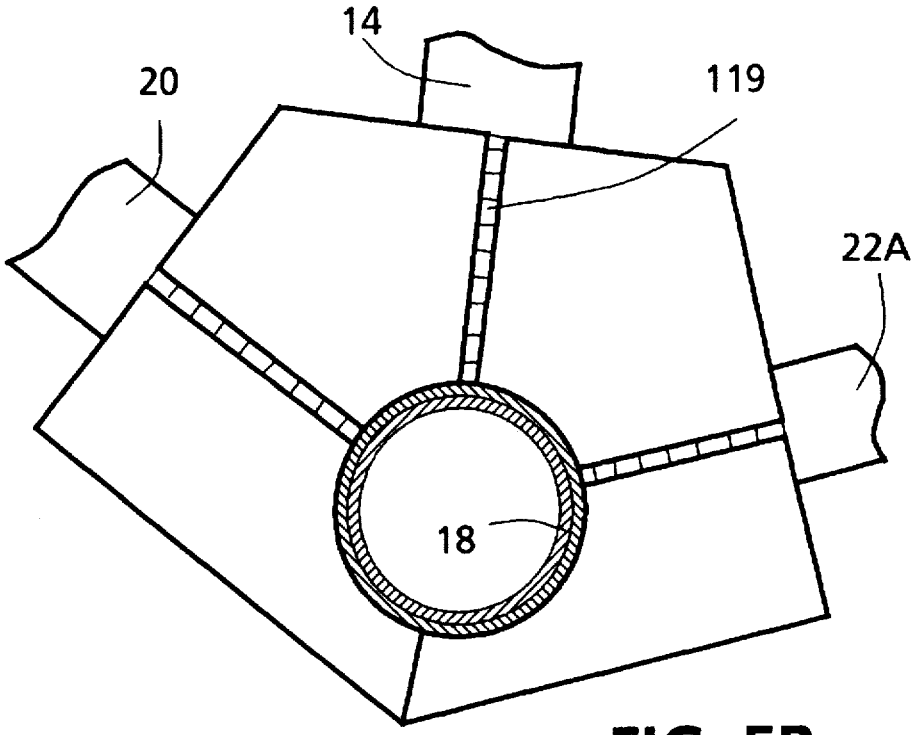
Figure 5C:
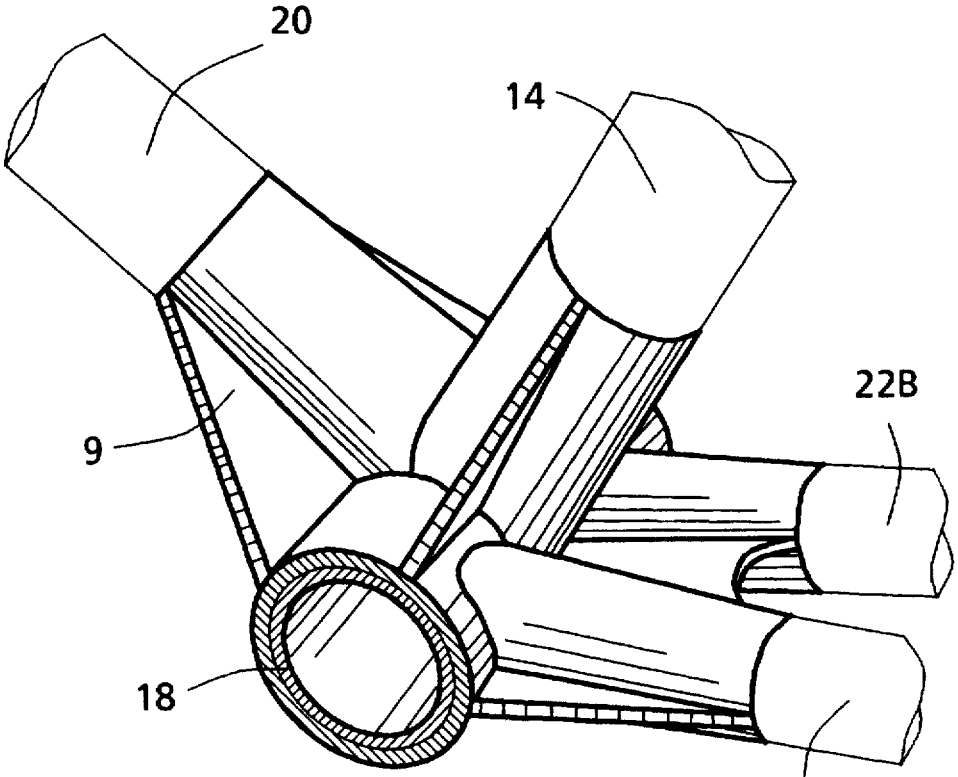

The excess composite material squeezed between the mold sections would normally be considered "flash." The present invention utilizes this "flash" by trimming it into reinforcing integral gussets. The flash is trimmed and shaped to form gussets 106, 108, and 110 which are integrally formed with the associated structural joints. FIG. 5A thews a set of bottom bracket mold sections 112, 114, 116 and 118. Again, mold release is preferably applied to ease separation of the sections once the joint is formed. Carbon fiber fabric impregnated with uncured epoxy 119 is laid onto the appropriate surface of the room sections. The bottom bracket shell 18 is fixed in the appropriate position. Next the mitered ends of the down tube 20, seat tube 14, and chain stays 22a and 22b are positioned against the bottom bracket shell 18. The mold parts are moved into position and secured together as shown in FIG. 5B. Once the epoxy has cured, the mold sections are removed and the gussets 9 which extend in a direction [transverse] *plane* to the direction which the plane of the frame (established by, for example, the longitudinal axes of tubes 12, 14, 16 and 20) extends, are trimmed. The resulting joint is shown in FIG. 5C.

Figure 6C:
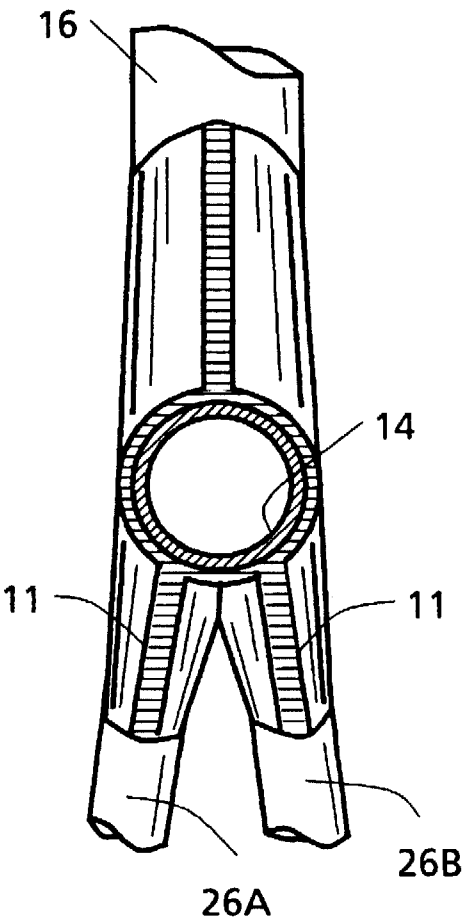
FIGS. 6A, 6B, and 6C show the steps and result of the process of forming the seat tube connection according to the present invention.
Figure 6B:
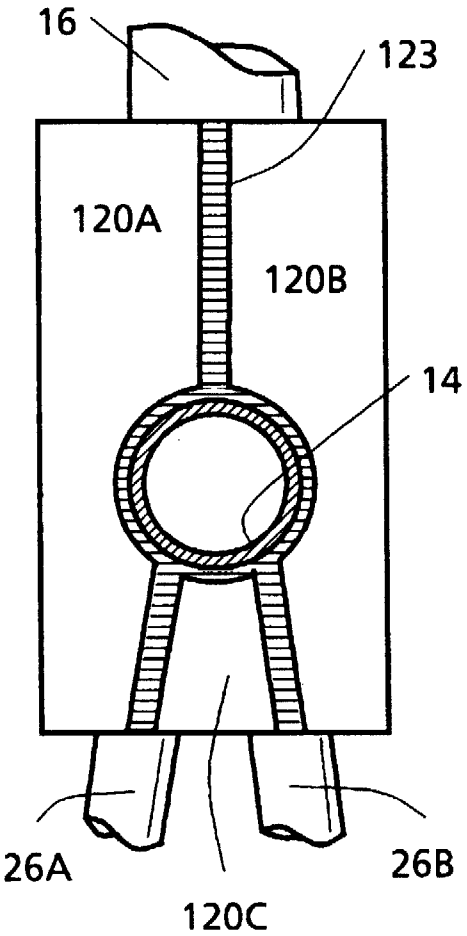
Figure 6A:
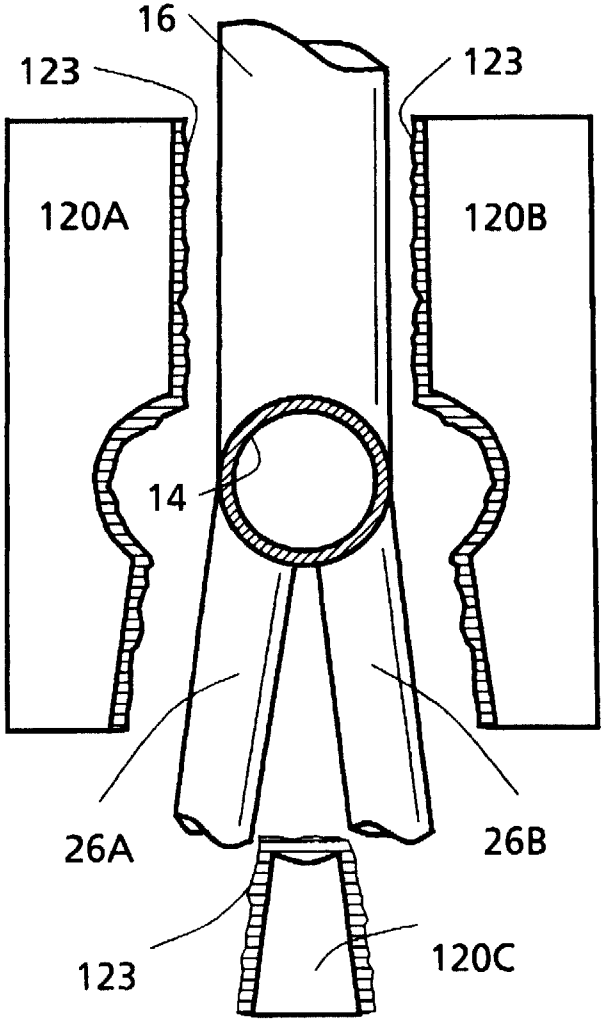

FIG. 6A shows the mitered ends of the top tube 16, and of the seat stays 26a and 26b positioned against the top (seat) end region of seat tube 14. Carbon fiber fabric impregnated with uncured epoxy 123 is laid on the appropriate surfaces of the seat tube mold sections 120a, 120b, 120c. FIG. 6B shows the mold sections 120a, 120b, 120e in their secured position. FIG. 6C shows the resulting connection, after the removal of the mold sections and the trimming of the gussets 11.

A feature of the present invention is the ability to alter the stiffness of the frame, allowing it to be tailored for the different riding characteristics necessary for various types of riding such as racing and touring. This is done by altering the "lay-up" (e.g., the orientation of the carbon fiber in the tubes and/or joints) prior to or during the frame building process. This tailoring has no affect on the tooling, mitering or molding processes described above.

In addition, it is possible to slightly alter the ride characteristics (e.g., stiffness) of the frame after it has been produced, by varying the amount of trimming, performed on the gussets. It is also possible to "fine-tune" the ride characteristics of an assembled bicycle in the same manner.

Ride and structural characteristics may further be controlled by the introduction of non-fiber tubes, such as titanium, into the frame. The non-fiber tubes may be complete frame tubes or may be sectional inserts, selectively altering the ride and strength characteristics as appropriate. Typically, the non-fiber tubes will be used in locations subject to high stress concentrations or local pressure points. One such location is inside the head tube, which is typically heavily loaded by the headset bearing cups. Another possible location is inside the bottom bracket shell which is typically heavily loaded by the bottom bracket bearing cups or sealed bearings.

A further feature of the present invention is the ability to build several different sizes of frames from a single set of molds. This is done by simply changing the lengths of the tubes and repositioning the molds on the tables. It is anticipated that holes will exist in the table, allowing the molds to be quickly and simply bolted down in pre-determined positions which ensure proper alignment. One mold table and a few sets of molds can be used to produce a wide variety of frame sizes.

To those skilled in the art to which this invention relates, may changes in construction and application and widely differing embodiments and combinations of the present invention will suggest themselves without departing from its spirit and scope. The disclosures and descriptions herein are merely illustrative and are not to be considered limiting in any sense.

What is claimed is:

1. A bicycle frame, comprising:

a head tube;

a seat tube;

a top tube extending between said head tube and said seat tube;

a bottom bracket shell disposed at a first longitudinal end of said seat tube;

a down tube extending between said head tube and said bottom bracket shell;

two chain stays extending from said bottom bracket shell in a direction away from said down tube;

two rear drop-outs, each said drop-out disposed in joining relationship to one of said chain stays at a first longitudinal end thereof farthest from said bottom bracket shell;

two seat stays, each said seat stay extending from a second longitudinal end region of said seat tube opposite said first longitudinal end to one of said rear drop-outs; and continuous fiber composite material with hardening agents impregnated therein, substantially surrounding, and in laminated contact with, the junction between:

(a) said head tube and said top tube, (b) said head tube and said down tube, (c) said seat tube and said top tube, (d) each said chain stay and each said rear drop-out, (e) each said seat stay and said seat tube, and (f) each said seat stay and each said rear drop-out, thereby forming a structural joint connecting said tubes at each said junction, a structural joint connecting said seat stays and said rear drop-outs, and a structural joint connecting said chain stays and said rear drop-outs, and integrated structural joints and gussets of continuous fiber composite material with hardening agents impregnated therein wrapped in laminated contact with, and connecting:

(a) said seat tube and said bottom bracket shell, (b) said down tube and said bottom bracket shell, and (c) each said chain stay and said bottom bracket shell, such that at least one of said gussets extends in a plane whose direction is transverse to the direction of a plane in which the longitudinal axes of at least the head tube, seat tube, top tube, and down tube lie.

2. A bicycle frame, comprising:

a continuous fiber composite material head tube;

a continuous fiber composite material seat tube;

a continuous fiber composite material top tube extending between said continuous fiber composite material head tube and said continuous fiber composite material seat tube;

a bottom bracket shell disposed at a first longitudinal end of said continuous fiber composite material seat tube;

a continuous fiber composite material down tube extending between said continuous fiber composite material head tube and said bottom bracket shell;

two continuous fiber composite material chain stays extending from said bottom bracket shell in a direction away from said continuous fiber composite material down tube;

two rear drop-outs, each sad drop-out disposed in joining relationship to one of sad continuous fiber composite material chain stays at a first longitudinal end thereof farthest from said bottom bracket shell;

two continuous fiber composite material seat stays, each said seat stay extending from a second longitudinal end region of said continuous fiber composite material seat tube opposite said first longitudinal end to one of said rear drop-outs; and continuous fiber composite material with hardening agents impregnated therein, substantially surrounding, and in laminated contact with, the junction between:

(a) said continuous fiber composite material head tube and said continuous fiber composite material top tube, (b) said continuous fiber composite material head tube and said continuous fiber composite material down tube, (c) said continuous fiber composite material seat tube and said continuous fiber composite material top tube, (d) each said continuous fiber composite material chain stay and one rear drop-out, (e) each said continuous fiber composite material seat stay and said continuous fiber composite material seat tube, and (f) each said continuous fiber composite material seat stay and one rear drop-out, thereby forming a structural joint connecting said tubes at each said junction, a structural joint connecting said seat stays and said rear drop-outs, and a structural joint connecting said chain stays and said rear drop-outs, and integrated structural joints and gussets of continuous fiber composite material with hardening agents impregnated therein wrapped in laminated contact with, and connecting:

(a) said continuous fiber composite material seat tube and said bottom bracket shell, (b) said continuous fiber composite material down tube and said bottom bracket shell, and (c) each said continuous fiber composite material chain stay and said bottom bracket shell, such that at least one of said gussets extends in a plane whose direction is transverse to the direction of a plane in which the longitudinal axes of at least the head tube, seat tube, top tube, and down tube lie.

3. A bicycle frame, comprising:

a continuous fiber composite material head tube;

a continuous fiber composite material seat tube;

a continuous fiber composite material top tube extending between said continuous fiber composite material head tube and said continuous fiber composite material seat tube;

a bottom bracket shell disposed at a first longitudinal end of said continuous fiber composite material seat tube;

a continuous fiber composite material down tube extending between said continuous fiber composite material head tube and said bottom bracket shell;

two continuous fiber composite material chain stays extending from said bottom bracket shell in a direction away from said continuous fiber composite material down tube;

two rear drop-outs, each sad drop-out disposed in joining relationship to one of said continuous fiber composite material chain stays at a first longitudinal end thereof farthest from said bottom bracket shell;

two continuous fiber composite material seat stays, each said seat stay extending from a second longitudinal end region of said continuous fiber composite material seat tube opposite said first longitudinal end to one of said rear drop-outs; and integrated structural joints and gussets of continuous fiber composite material with hardening agents impregnated therein, wrapped in laminated contact with and connecting:

(a) said continuous fiber composite material head tube and said continuous fiber composite material top tube, (b) said continuous fiber composite material head tube and said continuous fiber composite material down tube, (c) said continuous fiber composite material seat tube and said continuous fiber composite material top tube, (d) each said continuous fiber composite material seat stay and said continuous fiber composite material seat tube; and integrated structural joints and gussets of continuous fiber composite material hardening agents impregnated therein wrapped in laminated contact with, and connecting:

(a) said continuous fiber composite material seat tube and said bottom bracket shell, (b) said continuous fiber composite material down tube and said bottom bracket shell, and (c) each said continuous fiber composite material chain stay and said bottom bracket shell, such that at least one of said gussets extends in a plane whose direction is transverse to the direction of a plane in which the longitudinal axes of at least the head tube, seat tube, top tube, and down tube lie; and a structural joint of continuous fiber composite material with hardening agents impregnated therein, wrapped in laminated contact with, and connecting:

(a) each said continuous fiber composite material chain stay and one rear drop-out, and (b) each said continuous fiber composite material seat stay and one rear drop-out.

4. The bicycle frame according to claim 3, further comprising a metal tube core located inside said continuous fiber composite material head tube, thereby proving additional structural integrity of said head tube.

5. The bicycle frame according to claim 4, wherein said metal is titanium.

6. The bicycle frame according to claim 3, wherein said rear drop-outs are metal.

7. The bicycle frame according to claim 6, wherein said metal is titanium.

*8. A bicycle frame of the type including a plurality of tubes of the type which are joined to a bottom bracket shell, the tubes having longitudinal axes, and the frame extending in a plane defined by the longitudinal axes of the tubes, comprising:*

*continuous fiber composite material with hardening agents impregnated therein, substantially surrounding, and in laminated contact with, a junction between said tubes and said bottom bracket shell to form at least one integrated structural joint and gusset between said tubes and said bottom bracket shell, said at least one gusset extending in a plane transverse to the plane of the frame.*

*9. The bicycle frame of claim 8, wherein said bottom bracket shell is comprised at least in part of continuous fiber composite material, and further comprising a metal tube core located inside said bottom bracket shell.*

*10. The bicycle frame of claim 8, wherein said integrated structural joint and gusset further comprises an integrated chain stay bridge.*

*11. A bicycle frame of the type including a plurality of tubes of the type which are joined to a bottom bracket shell, the tubes having longitudinal axes, and the frame extending in a plane defined by the longitudinal axes of the tubes, comprising:*

*continuous fiber composite material with hardening agents impregnated therein, substantially surrounding, and in laminated contact with, a junction between said tubes and said bottom bracket shell to form at least one integrated structural joint, gusset, and chain stay bridge at least in part between said tubes and said bottom bracket shell, said at least one integrated structural joint, gusset, and chain stay bridge extending in a plane transverse to the plane of the frame.*

*12. The bicycle frame of claim 11, wherein said bottom bracket shell is comprised at least in part of continuous fiber composite material, and further comprising a metal tube core located inside said bottom bracket shell.*

*13. A structural joint for a bicycle frame of the type securing together a plurality of tube sections, the tube sections having longitudinal axes, and the frame extending in a plane defined by the longitudinal axes of the tube sections, comprising:*

*continuous fiber composite material with hardening agents impregnated therein, substantially surrounding, and in laminated contact with, a junction between said tube sections to form at least one integrated structural joint and gusset between said tube sections, said at least one gusset extending principally in a plane transverse to the plane of the frame.*

*14. The structural joint of claim 13, wherein at least one of said tube sections is formed principally of continuous fiber composite material having hardening agents impregnated therein, and further comprising a metal tube core located inside said at least one tube section.*

* * * * *